United States Patent
Majumdar et al.

(10) Patent No.: US 12,368,757 B2
(45) Date of Patent: *Jul. 22, 2025

(54) INTENT-BASED ENTERPRISE SECURITY USING DYNAMIC LEARNING OF NETWORK SEGMENT PREFIXES

(71) Applicant: Juniper Networks, Inc., Sunnyvale, CA (US)

(72) Inventors: Kaushik Dutta Majumdar, Bangalore (IN); FNU Nadeem, Fremont, CA (US); Shanmukh Uppuluri, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,531

(22) Filed: Feb. 22, 2024

(65) Prior Publication Data

US 2024/0195844 A1    Jun. 13, 2024

Related U.S. Application Data

(63) Continuation of application No. 17/301,278, filed on Mar. 30, 2021, now Pat. No. 12,095,817.

(51) Int. Cl.
*H04L 9/40*    (2022.01)
(52) U.S. Cl.
CPC ......... *H04L 63/20* (2013.01); *H04L 63/0227* (2013.01)
(58) Field of Classification Search
CPC ............... H04L 63/20–205; H04L 63/02–029
See application file for complete search history.

(56) References Cited

U.S. PATENT DOCUMENTS 7,095,738 B1    8/2006  Desanti
8,879,394 B2    11/2014 Allan et al.
(Continued)

FOREIGN PATENT DOCUMENTS

CN        1754350 A    3/2006
CN      101019381 A    8/2007
(Continued)

OTHER PUBLICATIONS

A. Campanella, "Intent Based Network Operations," 2019 Optical Fiber Communications Conference and Exhibition (OFC), San Diego, CA, USA, 2019, pp. 1-3. (Year: 2019).
(Continued)

*Primary Examiner* — Madhuri R Herzog
(74) *Attorney, Agent, or Firm* — Shumaker & Sieffert, P.A.

(57) ABSTRACT

In an example, systems and methods enable automatic implementation of intent-based security policies in a network system, such as a software-defined wide area network system, in which network segment prefixes for network segments at one or more sites are dynamically learned. A service orchestrator controller translates an intent-based security policy input by a user to a security policy for a first site. The security policy for the first site specifies a segment-specific queryable resource associated with a second site. To implement the security policy, a device associated with the first site queries the segment-specific queryable resource associated with the second site, and updates one or more forwarding tables of the device with the network segment prefixes associated with one or more network segments at the second site received in response to the query. The first site forwards network traffic to the second site based on the updated forwarding tables.

20 Claims, 6 Drawing Sheets

(56) References Cited

U.S. PATENT DOCUMENTS

| | | | |
|---|---|---|---|
| 9,906,402 B2 | 2/2018 | Ramachandran et al. | |
| 10,135,652 B2 | 11/2018 | Rong et al. | |
| 10,594,560 B2* | 3/2020 | Prasad | H04L 41/0856 |
| 10,630,509 B2 | 4/2020 | Bickhart et al. | |
| 2006/0092949 A1 | 5/2006 | Thubert et al. | |
| 2006/0179480 A1 | 8/2006 | Jardin et al. | |
| 2007/0250642 A1 | 10/2007 | Thubert et al. | |
| 2012/0117617 A1 | 5/2012 | Krupp et al. | |
| 2013/0132468 A1 | 5/2013 | Azeez et al. | |
| 2015/0381493 A1 | 12/2015 | Bansal et al. | |
| 2017/0005923 A1 | 1/2017 | Babakian | |
| 2017/0134274 A1 | 5/2017 | Araújo | |
| 2017/0279717 A1 | 9/2017 | Bethers et al. | |
| 2018/0331945 A1 | 11/2018 | Attarwala | |
| 2018/0375802 A1 | 12/2018 | Wackerly | |
| 2019/0297114 A1 | 9/2019 | Panchalingam et al. | |
| 2020/0177550 A1 | 6/2020 | Valluri et al. | |
| 2020/0344171 A1* | 10/2020 | Sharma | H04L 47/20 |
| 2021/0021511 A1 | 1/2021 | James et al. | |
| 2021/0044565 A1 | 2/2021 | Moreno et al. | |
| 2021/0135995 A1 | 5/2021 | Saklikar et al. | |
| 2022/0321604 A1 | 10/2022 | Majumdar et al. | |

FOREIGN PATENT DOCUMENTS

| | | | |
|---|---|---|---|
| CN | 102474499 A | 5/2012 | |
| CN | 104718733 A | 6/2015 | |
| CN | 105306333 A | 2/2016 | |
| CN | 105659683 A | 6/2016 | |
| CN | 106375027 A | 2/2017 | |
| CN | 107078921 A | 8/2017 | |
| CN | 110324226 A | 10/2019 | |
| WO | 2017015667 A1 | 1/2017 | |

OTHER PUBLICATIONS

Chai et al., "Key Technology in SD-WAN", ZTE Technology Journal, vol. 25, No. 2, China Academy of Information and Communications Technology, Mar. 26, 2019, pp. 15-19, URL: https://www.zte.com.cn/content/dam/zte-site/res-www-zte-com-cn/mediares/magazine/publication/com_cn/article/201902/cn201902003.pdf.

Extended Search Report from counterpart European Application No. 21181788.7 dated Dec. 10, 2021, 6 pp.

First Office Action and Search Report, and translation thereof, from counterpart Chinese Application No. 202110873600.9 dated Jan. 26, 2024, 8 pp.

Response to Communication pursuant to Rule 69 EPC dated Oct. 10, 2022, from counterpart European Application No. 21181788.7 filed Apr. 3, 2023, 10 pp.

Zhou et al., "EBoD—Building up the Open SD-WAN Network Service Platform", ZTE Technology Journal, vol. 25, No. 2, China Mobile Research Institute, Apr. 8, 2019, pp. 20-27, URL: https://www.zte.com.cn/content/dam/zte-site/res-www-zte-com-cn/mediares/magazine/publication/com_cn/article/201902/cn201902004.pdf.

Prosecution History from U.S. Appl. No. 17/301,278, dated May 18, 2023 through Feb. 22, 2024, 41 pp.

Notice of Allowance from U.S. Appl. No. 17/301,278 dated May 17, 2024, 11 pp.

Notice of Intent to Grant from counterpart Chinese Application No. 202110873600.9 dated Mar. 25, 2024, 3 pp.

Extended Search Report from counterpart European Application No. 24190065.3 dated Jan. 30, 2025, 7 pp.

* cited by examiner

INTENT-BASED ENTERPRISE SECURITY USING DYNAMIC LEARNING OF NETWORK SEGMENT PREFIXES

This application is a continuation of U.S. patent application Ser. No. 17/301,278, filed 30 Mar. 2021, the entire content of which is incorporated herein by reference.

TECHNICAL FIELD

The disclosure relates to computer networks and, more specifically, to implementation of security policies in a computer network.

BACKGROUND

Network providers and enterprises may use software-defined networking (SDN) in a wide area network (SD-WAN) to manage network connectivity among distributed locations or sites. SD-WAN enables businesses to create connections quickly and efficiently over the WAN, which may include the Internet and/or other transport networks that offer various WAN connection types and service levels.

Security policies enforce rules for traffic flow from one security zone to another security zone within a network by defining the kind(s) of traffic permitted from specified sources to specified destinations. Intent-based policies allow network administrators to create policies based on a desired outcome or business objective (the so-called "intent") according to logical business structures such as groups of users, departments, geographic locations, or other workgroups. Network software then translates this intent to one or more security policies configured to implement the intent within the network.

SUMMARY

In general, the disclosure describes techniques for automatically applying intent-based security policies in devices managed by a cloud-based network management system. For example, the disclosure describes techniques for automatically applying intent-based security policies in a network system in which devices (e.g., customer premises equipment (CPE) devices) dynamically learn network segment (e.g., LAN segment) prefixes for one or more network segments at one or more sites.

The techniques of the present disclosure may provide an advantage over other systems in which intent-based security policies based on dynamically learned LAN segment prefixes at one or more sites in a network are not possible. For example, the techniques of the present disclosure may enable implementation of more finely-grained intent-based security policies. In other words, rather than high level, coarse grained security policies that may are defined on a site-level basis, the techniques of the present disclosure allow finer-grained intent-based security policies to be defined at the segment level by specifying workgroups associated with network segment(s) at a site. In this way, intent-based security policies specifying workgroups associated with network segments may be specified. This fine-grained functionality allows more specificity in the types of business intents that can be realized in a software-defined wide area network.

In addition, by configuring CPE devices at each site to automatically query for and receive network segment prefixes for one or more other sites in the network, the techniques of the disclosure provide for distributed and periodic synchronization of all sites in the network without human intervention from the network administrator or the service orchestrator controller. Eliminating human intervention in the distribution of network segment prefixes may decrease the possibility of human errors or misconfigurations of devices in the network. Further, the service orchestrator controller does not have to explicitly synchronize the CPE device configurations for dynamically changing network segment addresses across the entire customer network; rather, the service orchestrator controller automatically receives and stores the network segment prefixes for each of the sites in its database, and the CPE devices themselves keep their mutual states synchronized in a distributed fashion by polling the segment-specific resource(s) periodically or on some other user-configurable basis. As a result, at any point the CPE devices in the network will have the latest state in the network without any intervention from the administrator or the service orchestrator controller.

In one example, the disclosure is directed to a network system comprising a device comprising processing circuitry, the device associated with a first site; and a service orchestrator comprising processing circuitry and a database, the service orchestrator configured to: store network segment prefixes for network segments at a second site in the database, the network segment prefixes having been dynamically learned at the second site via a routing protocol; translate an intent-based security policy specifying a rule for control of network traffic between the first site and a workgroup at the second site to a security policy specifying a segment-specific queryable resource associated with the workgroup at the second site; configure the device based on the security policy to query the segment-specific queryable resource; and in response to a query from the device to the segment-specific queryable resource associated with the workgroup at the second site, transmit at least one of the network segment prefixes for a network segment associated with the workgroup at the second site stored in the database for receipt by the device.

In another example, the disclosure is directed to a method comprising storing, by a device associated with a first site in a network system, a security policy that specifies a segment-specific queryable resource associated with a second site in the network system, wherein the security policy is translated from an intent-based security policy specifying the segment-specific queryable resource associated with the second site; querying, by the device in implementing the security policy, the segment-specific queryable resource associated with the second site; receiving, by the device in response to the query, network segment prefixes associated with one or more network segments at the second site; updating, by the device, a forwarding table of the device with the network segment prefixes associated with the one or more network segments at the second site received in response to the query; and controlling, by the device and based on the updated forwarding tables, network traffic between the first site and the second site.

In another example, the disclosure is directed to a method comprising translating, by a service orchestrator of a network system including a first site and a second site, an intent-based security policy to a security policy for the first site specifying a segment-specific queryable resource associated with the second site; storing, in a database associated with the service orchestrator, network segment prefixes associated with one or more network segments at the second site, the network segment prefixes having been dynamically learned at the second site via a routing protocol; and configuring, by the service orchestrator, a first device associated with the first site based on the security policy to query the segment-specific queryable resource associated with the second site to obtain, in response to the query, the network segment prefixes associated with the one or more network segments at the second site.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the text and figures.

DETAILED DESCRIPTION

Figure 1:
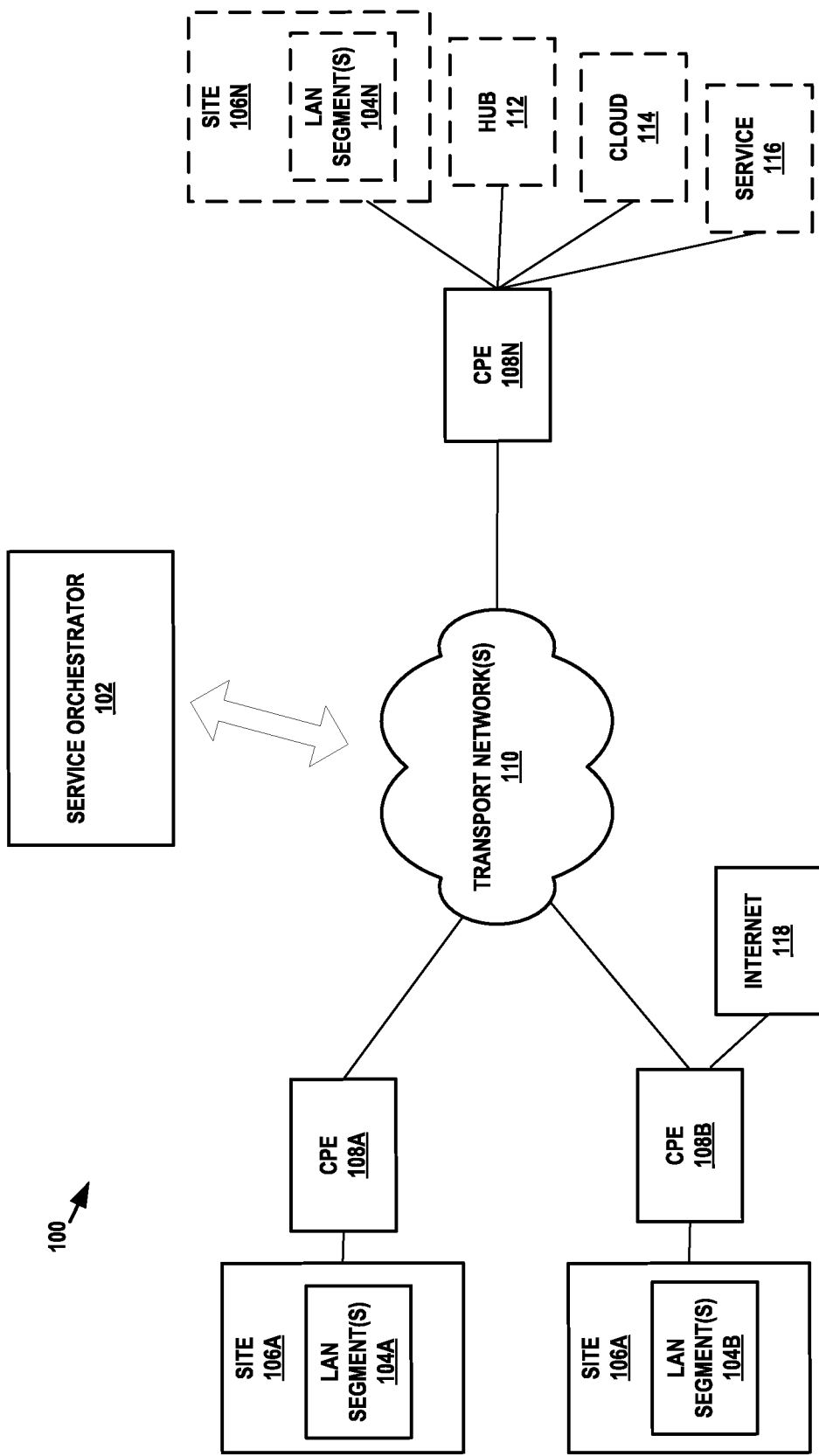
FIG. 1 is a block diagram illustrating an example software-defined wide area network (SD-WAN) system, in accordance with one or more techniques of this disclosure.

In a typical enterprise branch site network deployment, a customer premises equipment (CPE) device, such as a router, bridge, or switch, works as the gateway for a site. Each CPE device comprises processing circuitry including a LAN (Local Area Network) side interface facing one or more LAN segments for the site. A LAN segment is a section of a LAN that is used by a particular workgroup or department and separated from the rest of the LAN by a bridge, router or switch. Networks may be divided into multiple network segments or subnets for security purposes and to improve traffic flow by filtering out packets that are not destined for the segment.

Each LAN segment is assigned a network address (e.g., an IP address) having a unique prefix, and each device in a LAN segment is assigned a unique IP address having the same prefix as the corresponding LAN segment. The CPE learns and distributes the LAN prefixes to the service provider router providing WAN (Wide Area Network) connectivity or to a centralized cloud-based controller managing the route distribution across the enterprise sites.

In the case of a software-defined wide area network (SD-WAN) deployment, the centralized controller manages access between LAN segments across the network using routing and security policies. The routing policies distribute the LAN prefixes to different routing tables within the network for enabling access to the different LAN segments at the sites. Security policies control the specific traffic flows that are allowed to and/or from the enterprise sites, to provide enterprise security. Security policies are defined in terms of where the traffic to be managed is coming from (the source) and where the traffic to be managed is going to (the destination). To that end, security policies include one or more source addresses and one or more destination addresses.

Intent-based policies allow network administrators to create policies based on a desired outcome or business objective (the so-called "intent") according to logical business structures such as users, departments, geographical locations, or other workgroups (herein referred to generally as "workgroups"). Network software translates this intent to one or more security policies configured to implement the intent within the network.

Static LAN segment prefixes are manually configured on the LAN side interface and devices on the LAN side are allocated IP addresses from those subnet(s) only. These statically configured prefixes are communicated to the management plane of the centralized controller and can therefore be used to implement LAN segment-level security policies.

However, dynamically learned LAN segment prefixes, such as those learned through a dynamic routing protocol (e.g., the Border Gateway Protocol (BGP) or Open Shortest Path First Protocol (OSPF)), are learned only in the forwarding plane for routing purposes and are typically not learned in the management plane of the centralized controller. In addition, new prefixes may be added and/or withdrawn dynamically at any time without knowledge in the management plane of the centralized controller.

The dynamically learned LAN segment prefixes therefore cannot be used in security policies without continuous monitoring and manual intervention by a network administrator. Manual intervention of the administrator is required whenever a LAN segment prefix is dynamically added or withdrawn. In addition, if a new prefix is dynamically learned at a site, potentially all other sites in the enterprise also need to be configured to reflect that new state. In case of large enterprise sites or data centers where thousands of routes can potentially be learned dynamically, such manual intervention is not scalable and becomes practically impossible. In such examples, the only option available is usage of intent-based security policies having coarse granularity where dynamically learned LAN segment prefixes cannot be used.

In accordance with one or more techniques described herein, the disclosure describes techniques for automatically configuring intent-based security policies in devices managed by a cloud-based network management system. For example, the disclosure describes techniques for automatically configuring intent-based security policies in a software-defined wide area network (SD-WAN) in which devices at one or more sites in the network dynamically learn LAN segment prefixes for one or more LAN segments at the sites. Although described for purposes of example in terms of an SD-WAN environment, the techniques of the disclosure can be applied more broadly to any network implementation where the network management system is cloud based.

In general, an intent-based security policy may express a business intent by defining rules for communication between workgroups at different sites in the network. Each workgroup may be assigned to a particular LAN segment at a site. Each LAN segment at a site is typically separated from the other LAN segments at a site by a bridge, router or switch. An intent-based security policy allows expression of a high level business intent that does not require specific identification of the LAN segment addresses or prefixes associated with the expressed intent. In this way, intent-based security policies allow business application owners to express high-level business needs without needing to know or specify network configuration details such as network specific addresses at each of the sites. In some circumstances, however, such as those in which LAN segment prefixes at one or more sites in the network system are dynamically learned by the CPE devices associated with the sites, it is not possible to implement such fine-grained intent-based security policies because the management plane of the network service orchestrator does not "know" the LAN segment prefixes that were dynamically learned by the CPE device at the site.

In accordance with one or more techniques of this disclosure, a network service orchestrator controller translates the intent expressed an intent-based security policy associated with a first site and a workgroup at a second site to a security policy for the first site. The security policy specifies a segment specific queryable resource associated with the LAN segment at the second site associated with the workgroup specified in the intent-based security policy. The network controller further automatically receives dynamically learned network segment prefixes for the second site and stores the network segment prefixes in a database. Each network segment at each site has an associated segment-specific queryable resource. A CPE device associated with the first site configured with the security policy queries the segment-specific queryable resource associated with the LAN segment at the second site and updates one or more forwarding tables at the CPE device with the dynamically learned prefixes for the LAN segment at the second site received in response to the query. The frequency at which the first CPE device queries the segment-specific queryable resource associated with the LAN segment at the second site may be configurable by the user. The CPE device associated with the first site then forwards network traffic to the LAN segment at the second site based on the updated forwarding tables.

In this way, the intent-based security policy does not specify the segment-specific queryable resource for the LAN segment at the second site nor does it specify the dynamically learned prefixes for the LAN segment at the second site. Rather, the intent-based security policy specifies the workgroup(s) to which the intent-based security policy applies. The service orchestrator controller configures the CPE device associated with the first site with a translated security policy that specifies the segment-specific queryable resource for the LAN segment second site corresponding to the specified workgroup, and, in accordance with the translated security policy, the CPE device associated with the first site queries the segment-specific queryable resource for the LAN segment at the second site to obtain the dynamically learned LAN segment prefix(es) for the segment. Thus, segment-level intent-based security policies may be achieved for those LAN segments in which the LAN segment prefixes are dynamically learned by the CPE device(s) at the site(s).

Unlike systems requiring manual determination and configuration of LAN segment prefixes by network administrators, the techniques of the disclosure provide for automatic update and synchronization of the current state of the LAN segment prefixes at each site across the entire network. The techniques of the disclosure thus permit automatic implementation of fine-grained, LAN segment-level intent-based security policies for networks in which LAN segment prefixes at one or more of the sites in the network are dynamically learned. Because changes to the dynamically learned prefixes at each site are automatically made available via segment-specific queryable resources, and because a security policy is configured such that each site automatically queries a resource to obtain updated prefixes for segments at another site specified in the security policy, time consuming manual intervention is not required in order to implement LAN segment-level intent-based security policies. The implementation of such intent-based security policies may therefore be more efficient and more accurate than systems in which manual intervention is required. In addition, the techniques of this disclosure make automatic implementation of such fine-grained intent-based security policies possible for enterprises having a large number of sites, where continuous monitoring and manual intervention of dynamically learned LAN segment prefixes would be practically impossible.

FIG. 1 is a block diagram illustrating an example network system 100 in accordance with one or more techniques of this disclosure. Network system 100 includes one or more enterprise sites 106A-106N (or simply, sites 106A-106N), each including one or more network segments 104A-104N, respectively. In the examples described herein, network system 100 is a software-defined wide area network (SD-WAN) system. However, the techniques of this disclosure may also be applicable to other types of network systems, and the disclosure is not limited in this respect.

As described in further detail herein, network system 100 automatically applies intent-based security policies in devices managed by a cloud-based network management system. In the example of FIG. 1, network system 100 includes automatic implementation of intent-based security policies in a SD-WAN network system 100 in which network segment prefixes for network segments 104A-104N at one or more sites 106A-106N are dynamically learned. Although described for purposes of example in terms of an SD-WAN environment, the techniques of the disclosure can be applied more broadly to any network implementation where the network management system is cloud based. In addition, for purposes of example, network segments 104A-104N are described as Local Area Network (LAN) segments. However, network segments 104A-104N may also include other types of network segments, and the disclosure is not limited in this respect.

Network system 100 further includes one or more devices 108A-108N, each associated with one of sites 106A-106N, respectively. In the examples described herein, each of devices 108A-108N may include a customer premises equipment (CPE) device. Each of CPE devices 108A-108N includes processing circuitry and works as a gateway for the associated site 106. Each CPE device 108A-104N includes a network (e.g., LAN-side) side interface facing the network segments 104A-104N associated with the site. Network system 100 may optionally include one or more of provider hub(s) 112, cloud 114, or cloud service 116. In some cases, the "subscriber" and the SD-WAN provider are the same entity, as where an enterprise deploys and manages network system 100.

CPE devices 108A-108N are connected by one or more transport networks 110A-110N (collectively, "transport networks 110"). CPE devices 108A-108N use transport networks 110 to send application traffic across the network system 100 to other of CPE devices 108A-108N. One or more service providers may deploy transport networks 110, which may therefore alternatively be referred to as "service provider networks." Sites attached to service provider networks may be referred to as "subscriber sites." Transport networks 110 may offer separate connection types between any of CPE devices 108A-108N. The connections may be public or private and may be a network service offering, such as a label switched path (LSP), an Ethernet service, and IP service, a public Internet service, or other service that enables an overlay WAN link. Each connection may have a bandwidth limitation and/or specified performance metrics (e.g., latency, loss, jitter, and so forth). Network system 100 may be deployed using transport networks based on multiple different types of network service. In the example of FIG. 1, for instance, transport networks 110 may include one or more different network connection types for supporting communication between any of CPE devices 108A-108N. This diversity in the transport networks 110 may be advantageous for an SD-WAN service by facilitating redundancy and by offering differentiated service capabilities to enable matches between cost and service needs of the customer.

In some examples, a service provider may use network system 100 to offer an SD-WAN service to its subscribers or organizations authorized by such subscribers, which may include cloud providers, cloud networks, and subscriber partners for instance. The service provider may offer multiple SD-WAN services. For example, the SD-WAN service provider may be an enterprise, network/Internet service provider, cloud provider, or other entity.

Network system 100 includes a service orchestrator 102 that manages network services for sites 106A-106N. Service orchestrator 102 enables application-aware, orchestrated connectivity to deliver IP packets between sites associated with a subscriber according to policies. Control and ownership of service orchestrator 102, CPE devices 108, and transport networks 110 may be distributed among one or more service providers, subscribers, enterprises, or other organizations. Service orchestrator 102 may configure the network configurations of CPE devices 108, configure security policies on CPE devices 108, and so forth.

In various examples of network system 100, CPE devices 108A-108N, transport networks 110 and service orchestrator 102 may be combined to form a single service orchestration platform having separate service orchestration and domain orchestration layers, deployed as separate devices or appliances, or each may be distributed among one or more components executing on one or more servers deployed in one or more locations. Service orchestrator 102 may be a scalable and cloud deployable platform. For example, the service provider for SD-WAN services in network system 100 may deploy service orchestrator 102 or certain aspects of service orchestra 102 to a provider site or to a public, private, or hybrid cloud. As such, operations and functions attributed in this disclosure to service orchestrator 102 may be performed by a separate SD-WAN controller, and vice-versa. Aspects of service orchestration and SD-WAN control may also be distributed from service orchestrator 102 among one or more of CPE devices 108A-108N in some example architectures.

Administrators and applications may interface with service orchestrator 102 using northbound interfaces such as RESTful interfaces (e.g., web-based REST APIs), command-line interfaces, portal or graphical user interfaces, web-based user interface, or other interfaces of service orchestrator 102 (not shown in FIG. 1).

Each of sites 106A-106C refers to a subscriber location and may represent, for example, a branch office, private cloud, an on-premises spoke, an enterprise hub, a cloud spoke, etc. Provider hub(s) 112 represents a multitenant hub device located in a point-of-presence (POP) on the service provider network. Provider hub(s) 112 may terminate overlay tunnels for overlay networks, which may be of various types such as MPLS over Generic Route Encapsulation (MPLSoGRE) and MPLSoGRE over IPSec (MPL-SoGREoIPsec) and MPLS over User Datagram Protocol (MPLSoUDP) tunnels. Provider hub(s) 112 may be the hub in a hub-and-spoke architecture for some example deployments of SD-WAN service 101.

Cloud 114 represents a public, private, or hybrid cloud infrastructure. Cloud 114 may be a virtual private cloud within a public cloud. Cloud service 116 is a resource or higher order service that is offered by a cloud service provider to the subscriber over SD-WAN service 101. Cloud service 116 may be, for instance, Software as a Service (SaaS), Platform as a Service (PaaS), Infrastructure as a Service (IaaS), Storage as a Service, or other type of cloud service. Cloud service 116 may be offered by infrastructure of cloud 114.

Internet 118 represents the web and/or an Internet-connected service offered via the web. CPE device 108B, in this example, includes an Internet breakout 118 and assigns application flows to Internet breakout 118 by policy.

In some examples, each of CPE devices 108A-108N may include a physical network function or virtual network function for implementing an SD-WAN network service. In various examples, each of CPE devices 108A-108N may be, for instance, one or more Virtualized Network Functions (VNFs) or a Physical Network Function (PNF) located within any of a service provider data center, provider hub, customer premises, or cloud provider premises. Each of CPE devices 108A-108N may be a router, security device such as a firewall, a gateway, a WAN acceleration device, a switch, a cloud router, a virtual gateway, a cloud virtual gateway, an SD-WAN device, or other device that implements aspects of an SD-WAN network service.

In various examples, each of CPE devices 108A-108N may be an on-premises spoke that is a PNF placed at a subscriber branch site in either a hub-and-spoke or full mesh topology; a cloud spoke that is a VNF located in a subscriber's virtual private cloud (VPC) (or equivalent term) within a public cloud; a PNF or VNF located in a service provider cloud operating as a hub device to establish tunnels with the spoke sites (hub devices are multi-tenant, i.e., shared amongst multiple sites through the use of virtual routing and forwarding instances configured thereon); a PNF or VNF located at an enterprise and operating as an enterprise hub to provide additional hub-like capabilities to a normal spoke site (e.g., act as anchor point for spokes for dynamic virtual private network (VPN) creation, provide an on-premises central breakout option, host a data center department, import routing protocol routes to create a dynamic LAN segment, and meshing with other enterprise hubs that belong to the same tenant/subscriber). Each of CPE devices 108A-108N may be located at the location of any of sites 106, provider hub(s) 112, cloud 114, or cloud service 116.

CPE devices 108A-108N are logically located at the boundary between the transport networks 110 and the subscriber network at each site 106A-106N comprising one or more LAN segments 104A-104N, respectively. Each of CPE devices 108A-108N have network-side interfaces for the transport network connection and subscriber- or LAN-side interfaces for communication with the sites 106.

Service orchestrator 102 may deploy a SD-WAN service in various architectural topologies, including mesh and hub-and-spoke. A mesh topology is one in which traffic can flow directly from any site 106A-106N to any other site 106A-106N. In a dynamic mesh, CPE devices 108A-108N conserve resources for implementing full-mesh topologies. All of the sites in the full mesh are included in the topology, but the site-to-site VPNs are not brought up until traffic crosses a user-defined threshold called the Dynamic VPN threshold. Sites in the mesh topology may include sites 106, cloud 114, and/or cloud service 116. In a hub-and-spoke topology, all traffic passes through provider hub 112, more specifically, through CPE device 108N deployed at provider hub 112. By default, traffic to the Internet also flows through provider hub 112. In a hub-and-spoke topology, network services (e.g., firewall or other security services) may be applied at the provider hub 112 location, which allows all network traffic for an SD-WAN service to be processed using the network services at a single site. The SD-WAN service provided by network system 100 may have a regional hub topology that combines full mesh and hub-and-spoke using a one or more regional hubs that connect multiple spokes to a broader mesh.

In some examples, service orchestrator 102 includes one or more virtual route reflectors to facilitate routing of network traffic between CPE devices 108A-108N in network system 100. For routing purposes, the LAN segment prefixes associated with LAN segments 104A-104N at each site may be statically learned or dynamically learned. Statically learned LAN segment prefixes are assigned manually by an administrator. For dynamically learned LAN segment prefixes, a CPE device associated with a site dynamically learns LAN segment prefixes associated with one or more LAN segments at the site via a dynamic routing protocol. For example, in accordance with a dynamic routing protocol, the virtual route reflectors of service orchestrator 102 may form overlay Border Gateway Protocol (BGP) sessions with CPE devices 108A-108N to receive, insert, and reflect routes between one or more LAN segments 104A-104N within each site 106A-106N, respectively.

CPE devices 108A-108N receive ingress network traffic from corresponding subscriber sites and forward the network traffic via transport networks 110 to an intermediate one of CPE devices 108A-108N or to the destination subscriber site according to routing information provided by service orchestrator 102.

In accordance with one or more techniques described herein, network system 100 provides for automatic implementation of intent-based security policies in which network segment (e.g., LAN segment) prefixes for network (e.g., LAN) segments 104A-104N at one or more sites 106A-106N are dynamically learned by the CPE devices 108A-108N for each site.

Service orchestrator 102 manages one or more segment-specific queryable resources, each associated with a different one of the one or more network segments 104A-104N, through which a CPE device 108A-108N associated with one of sites 106A-106N may obtain dynamically learned prefixes for network segments at another one of sites 106A-106N. In some examples, the segment-specific queryable resources may include segment-specific Uniform Resource Locators (URLs). In such examples, service orchestrator 102 implements a feed server that manages queries to the segment-specific feed server Uniform Resource Locators and, in response to each query, returns LAN segment prefix(es) stored in a service orchestrator database corresponding to the queried segment-specific Uniform Resource Locator.

Service orchestrator 102 further includes a network controller that translates an intent-based security policy input by a user into a security policy for a first site (for example site 106A). The intent-based security policy specifies at least one workgroup corresponding to a network segment at a site (for example one of LAN segments 104B at site 106B). The intent-based security policy is a high level policy that specifies the workgroup(s) to which the security policy applies but does not need to specify the network segment or the network segment prefixes associated with the workgroup, for example. The translated security policy configures the CPE at the first site to perform actionable operational tasks designed to carryout the intent expressed in the intent-based security policy. For example, the translated security policy specifies a segment-specific queryable resource associated with the LAN segment at the second site corresponding to the specified workgroup. Service orchestrator 102 configures a first CPE device 108A associated with the first site 106A based on the translated security policy.

Once configured with the translated security policy, first CPE device 108A associated with the first site 106A queries the segment-specific queryable resource associated with the second site 106B. In response to the query, the first CPE device 108A receives the LAN segment prefixes associated with the LAN segment 104B at the second site 106B associated with the workgroup that are maintained in the service orchestrator database. The first CPE device 108A updates one or more forwarding tables with the LAN segment prefixes for the second site 106B received in response to the query. The first CPE device 108A then forwards network traffic to the network segment at the second site 106B (and thus to devices associated with the workgroup specified in the intent-based security policy) based on the updated forwarding tables.

A CPE device 108A-108N configured with a translated intent-based security policy may query a segment-specific Uniform Resource Locator to obtain prefixes associated with one or more LAN segments 104A-104N at another one of sites 106A-106N on a periodic basis. The frequency at which a CPE device 108A-108N periodically queries the segment-specific queryable resource associated with segments at another one of sites 106A-106N may be configurable by the user and may be periodic, at one or more scheduled times, or on demand.

In some examples, service orchestrator 102 may further configure second CPE device (CPE device 108B in this example) according to another version of the security policy to carry out symmetric functions to realize the intent expressed in the intent-based security policy, if any.

The techniques of the present disclosure may provide an advantage over other systems in which intent-based security policies based on network segment prefixes that are dynamically learned at one or more sites in a network are not possible. For example, the techniques of the present disclosure may enable use of more finely-grained intent-based security policies based on workgroups that are associated with network segments at one or more sites. In other words, rather than high level, coarse grained security policies that may only be defined on a site-level basis, the techniques of the present disclosure allow finer-grained intent-based security policies to be defined based on workgroups or other network segment level groups. This fine-grained functionality allows more specificity in the types of business intents that can be realized in an SD-WAN environment.

In addition, by configuring CPE devices at each site to automatically query for and receive updated LAN segment prefixes for one or more other sites in the network, the techniques of the disclosure provide for distributed and periodic synchronization of all sites in the network without human intervention from the network administrator or the service orchestrator controller. Eliminating human intervention in the distribution of network segment prefixes may decrease the possibility of human errors or misconfigurations of devices in the network. Further, the service orchestrator controller does not have to explicitly synchronize the CPE device configurations for dynamically changing LAN segment addresses across the entire customer network; rather, the service orchestrator controller automatically receives and stores the LAN segment prefixes for each of the sites in its database, and the CPE devices themselves keep their mutual states synchronized in a distributed fashion by polling the segment-specific resource(s). As a result, at any point the CPE devices in the network will have the latest state in the network without any intervention from the administrator or the service orchestrator controller.

Figure 2A:
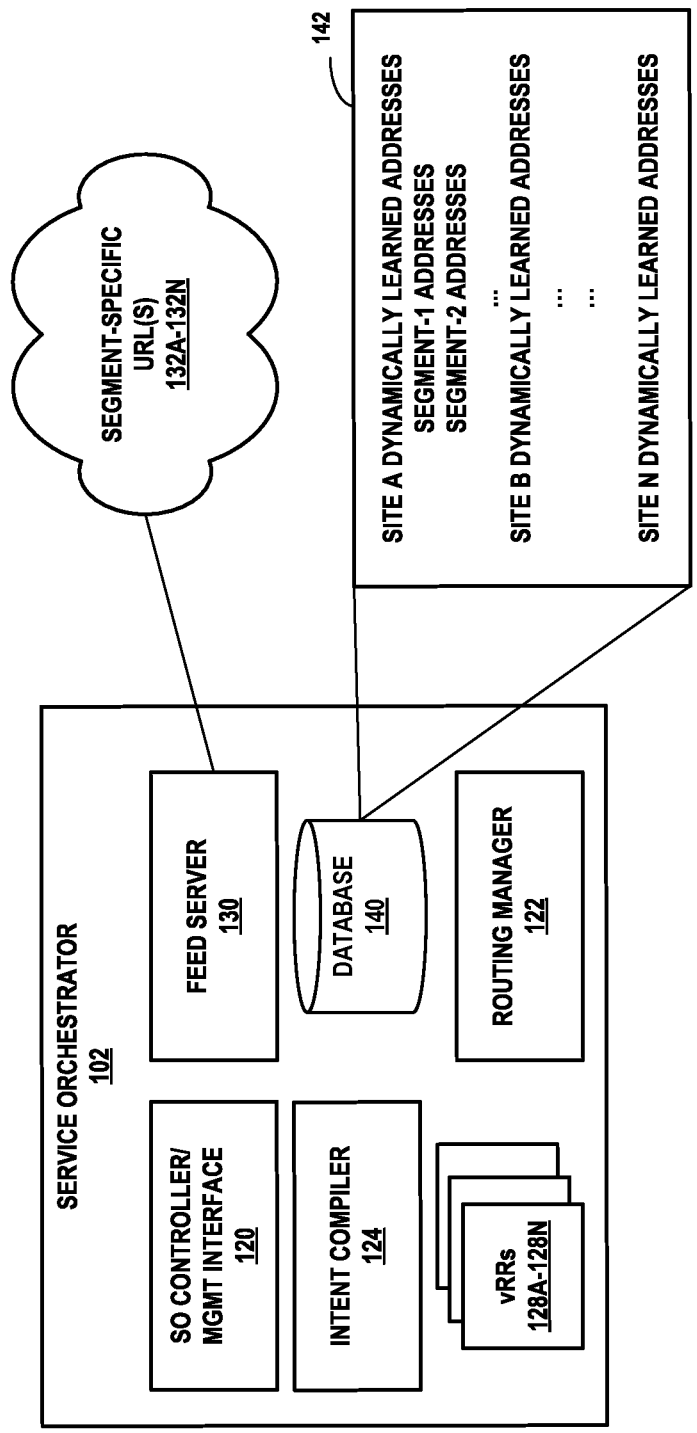
FIG. 2A is a block diagram illustrating an example service orchestrator, in accordance with one or more techniques of this disclosure.

FIG. 2A is a block diagram illustrating an example service orchestrator 102, in accordance with one or more techniques of this disclosure. As shown in FIG. 2A, example service orchestrator 102 includes a service orchestrator (SO) controller/management interface 120, a routing manager 122, an intent compiler 124, one or more virtual route reflectors 128A-128N, a feed server 130, and a database 140.

For network routing purposes, information concerning the LAN segment prefixes that are dynamically learned by the CPE devices 108A-108N at each of sites 106A-106N, respectively, are stored in virtual route reflectors (vRRs) 128A-128N. Virtual route reflectors 128A-128N maintain iBGP sessions with sites 106A-106N to dynamically learn all LAN segment prefixes from the sites and distribute the routing information throughout network system 100. At any point of time, therefore, virtual route reflectors 128A-128N contain the entire routing information of the sites 106A-106N on a per site basis.

In accordance with one or more techniques of this disclosure, a routing manager associated with SO controller 120 automatically receives the LAN segment prefixes that are dynamically learned at each of sites 106A-106N from virtual route reflectors 128A-128N and stores the LAN segment prefixes and/or any updates to the LAN segment prefixes, for each site in database 140.

Routing manager 122 controls the process by which SO controller 120 automatically receives the LAN segment prefixes for each of sites 106A-106N from virtual route reflectors 128A-128N and stores the LAN segment prefixes for each site in database 140. Database 140 stores the LAN segment prefixes associated with one or more LAN segments at each of sites 106A-106N as indicated by references numeral 142.

Figure 2B:
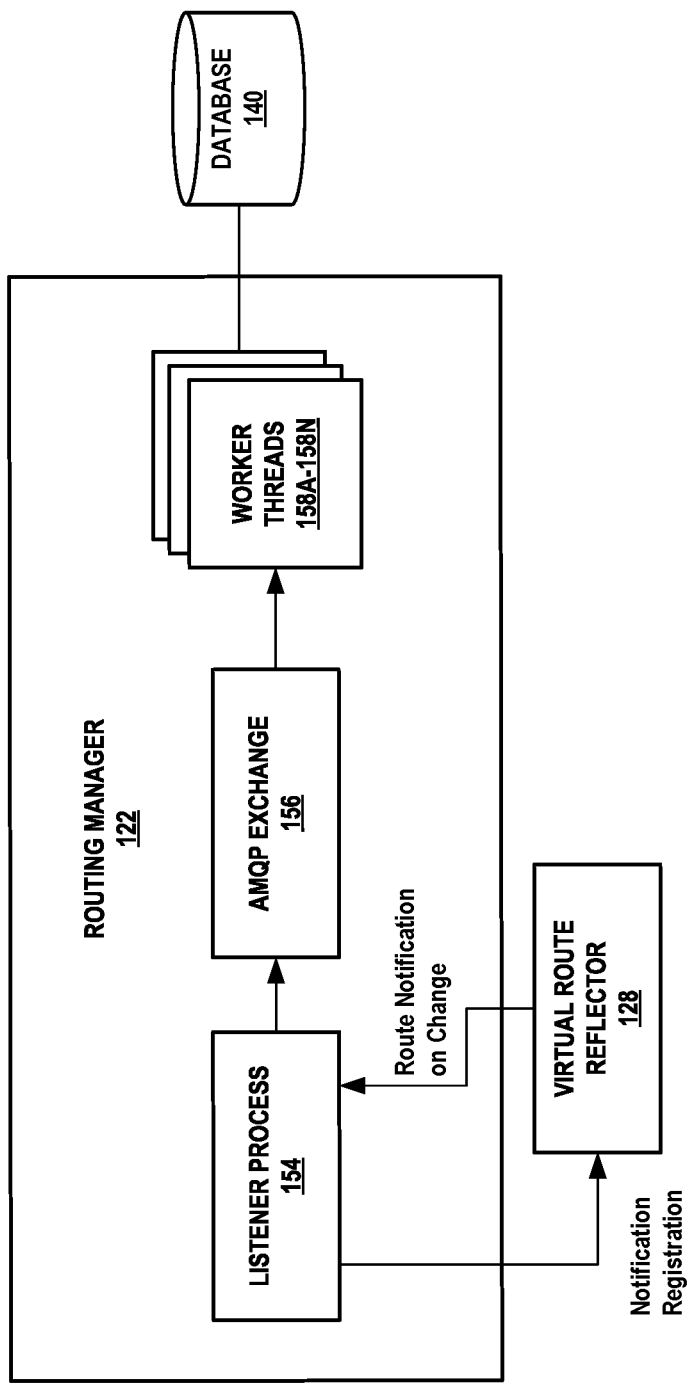
FIG. 2B is a block diagram illustrating an example routing manager in further detail, in accordance with one or more techniques of this disclosure.

Service orchestrator 102 manages one or more segment-specific queryable resources 132A-132N, each associated with a different one of the one or more segments 104A-104N at sites 106A-106N, respectively. Through these queryable resources 132A-132N, a CPE device 108A-108N associated with one of sites 106A-106N may obtain dynamically learned LAN segment prefixes for a LAN segment at another one of sites 106A-106N in accordance with a security policy. In the example of FIG. 2, the segment-specific queryable resources include segment-specific Uniform Resource Locators (URLs). In such examples, SO controller 120 implements a feed server 130 that manages queries to the segment-specific feed server URLs and, in response to a query, returns the LAN segment prefixes stored in the service orchestrator database (such as database 140 as shown in FIGS. 2A and 2B) corresponding to the queried segment-specific URL.

For example, a segment-specific URL may be structured as, "https://<feed-server address>/<site name>/<LAN-segment name>." Feed server 130 fetches the data for each LAN-segment by appending the site/LAN-segment information.

In operation, a user may input an intent-based security policy. For example, a user may input the intent-based security policy at any one of CPE devices 108A 108N in the network. Alternatively, a user may enter the intent-based security policy at the management interface of SO controller 120.

In general, the intent-based security policy input by the user includes at least one workgroup to which the intent-based security policy applies. Depending upon the policy, the workgroup may be the "source" from which a communication is sent or a "destination" which receives the communication. The intent-based security policy may specify rules for one-way communication between workgroups at different sites or may specify rules for two-way communication between workgroups at different sites. In the intent-based security policy, the source and destination are expressed according to logical business structures such as workgroups or other LAN segment level groupings. In other words, the "intent" expressed in the intent-based security policy defines rules (e.g., permit, deny, reject, etc.) with respect to communications between one or more workgroups at the first site 106A and one or more workgroups at a second site 106B.

The workgroups specified in the intent-based security policy are associated with different sites 106A-106N. For example, a first workgroup may be associated with a first LAN segment at first site 106A and a second workgroup may be associated with a second LAN segment at second site 106B. In some examples, SO controller 120, executing intent compiler 124, translates the intent-based security policy input by the user into a security policy for the first CPE device 108A associated with the first site. The security policy configures first CPE device 108A associated with the first site 106A to perform actionable operations on the network environment aimed at carrying out the "intent" expressed in the intent-based security policy with respect to communications between the first site 106A and the second site 106B. For example, the security policy configures first CPE device 108A to query a segment-specific queryable resource for the LAN segment at second site 106B corresponding to the second workgroup.

The security policy includes a static address group and a dynamic address group, each of which are associated with the LAN segment associated with the second workgroup at the second site (site 106B in this example). The static address group includes the address prefix lists for the second site 106B learned by explicit (e.g., static or manual) user-input. SO controller 120 directly configures these on the first CPE device 108A using a command line interface. The dynamic address group specifies a segment-specific queryable resource (Uniform Resource Locator 142B in this example) associated with the LAN segment associated with the second workgroup at the second site 106B. The security policy thus configures first CPE device 108A to query the segment-specific queryable resource associated with the LAN segment at the second site 106B in order to obtain the dynamically learned LAN segment prefix(es) for that LAN segment.

In some examples, the security policy configures first CPE device 108A to periodically query the segment-specific queryable resource associated with the LAN segment associated with the second workgroup at the second site 106B. The frequency at which first CPE device 108A queries the segment-specific queryable resource may be configurable by a network administrator.

FIG. 2B is a block diagram illustrating an example routing manager 122 in further detail, in accordance with one or more techniques of this disclosure. Routing manager 122 controls the process by which SO controller 120 automatically receives the LAN segment prefixes dynamically learned for each of sites 106A-106N from virtual route reflectors 128A-128N and stores the received LAN segment prefixes in database 140. FIG. 2B shows a specific implementation using an AMQP (Advanced Message Queueing protocol) exchange 156 and Celery worker threads 158A-158N. However, the same functionality could also be implemented using any other messaging or stream processing platform, and the disclosure is not limited in this respect.

Routing manager 122 includes a listener process 154, AMQP exchange 156, and worker threads 158A-158N. As mentioned above, at any point of time the virtual route reflectors 128A-128N contain the entire routing information of the sites 106A-106N on a per site basis. In this example, the intent compilers are run as containers with a pool of worker threads. When the container comes up, a standalone process is started separate from the worker context. This occurs whenever an update to the dynamically learned prefixes for a site is detected. This process establishes secured gRPC (Google Remote Procedure Call) channels to all the virtual route reflectors 128A-128N associated with SO controller 120. This process also establishes registers for route update notifications. In this example, the virtual route reflectors work as gRPC servers and send back notifications from one or more virtual route reflectors indicative of changes to dynamically learned network segment prefixes at one or more sites in the network system as asynchronous responses to listener process 154. The changes are specified granular to the sites. Listener process 154 publishes the messages to exchange 156. Worker threads 158A-158N pick up the messages (i.e., the dynamically learned addresses) in bulk and process them to store in database 140 as well as in in-memory cache with metadata such as site and LAN segment information so that other applications can read them efficiently whenever necessary.

Figure 3:
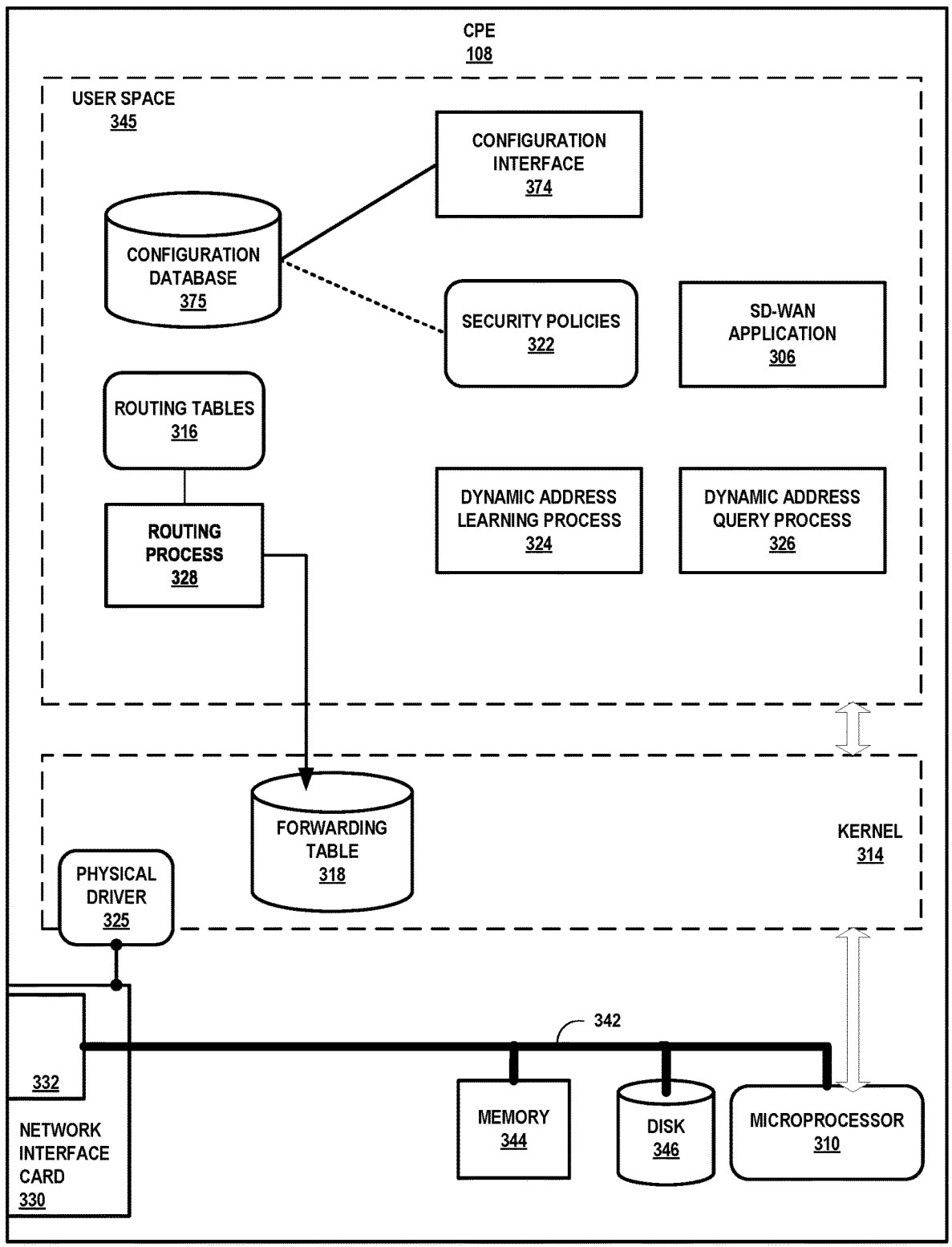
FIG. 3 is a block diagram illustrating an example customer premises equipment (CPE) device, in accordance with one or more techniques of this disclosure.

FIG. 3 is a block diagram illustrating an example CPE device 108, in accordance with one or more techniques of this disclosure. CPE device 108 may represent any of CPE devices 108A-108N of FIG. 1. CPE device 108 is a computing device and may include one or more real or virtual servers configured to execute one or more PNFs (Physical Network Functions) or VNFs (Virtual Network Functions) to perform operations of a CPE device.

In this example, CPE device 108 includes a bus 342 coupling hardware components of a hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Memory device 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory device 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory. Interfaces 332 may be interfaces for underlay connections of WAN links configured for SD-WAN application 306 between CPE device 108 and one or more other CPE devices in network system 100.

Memory device 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use NIC 330.

The hardware environment and kernel 314 provide a user space 345 operating environment for CPE device 108 applications, including routing process 328, configuration interface 374, and SD-WAN application 306. Configuration interface 374 enables SO controller 120 or an operator to configure CPE device 108. Configuration interface 374 may provide a NETCONF interface, Simple Network Management Protocol (SNMP), a command-line interface, a RESTful interface, Remote Procedure Calls, or other interface by which remote devices may configure CPE device 108 with configuration information stored to configuration database 375.

CPE device 108 executes SD-WAN application 306 to implement an SD-WAN service over network system 100 of FIG. 1. Routing process 328 executes routing protocols to exchange routing information (e.g., routes) with other network devices and uses the routing information collected in routing table 316 to select the active route to each destination, which is the route used by CPE device 108 to forward incoming packets to that destination. To route traffic from a source host to a destination host via CPE device 108, CPE device 108 learns the path that the packet is to take. These active routes are inserted into the forwarding table 318 of CPE device 108 and used by the forwarding plane hardware for packet forwarding. For example, routing process 328 may generate forwarding table 318 in the form of a radix or other lookup tree to map packet information (e.g., header information having destination information and/or a label stack) to next hops and ultimately to interfaces 332 for output. In some examples, CPE device 108 may have a physically bifurcated control plane and data plane in which a switching control card manages one or more packet forwarding line cards each having one or more high-speed packet processors.

In accordance with one or more techniques of this disclosure, a centralized controller (such as SO controller 120 as shown in FIG. 2A) configures a CPE device 108 associated with a first site (e.g., CPE device 108A associated with site 106A) according to a security policy specifying a segment-specific queryable resource associated with a LAN segment at a second site (for example, site 106B). The security policy was translated by a service orchestrator (such as service orchestrator 102) from an intent-based security policy specifying a workgroup at the second site input by a user. The intent-based security policy may be input (e.g., by a user) at, for example, the configuration interface 374 of the first CPE 108A associated with the first site, the configuration interface 374 of a second CPE 108B associated with the second site, the configuration interface 374 of any of CPEs 108A-108N in the network, and/or at the SO controller/management interface 120 of the service orchestrator 102. CPE 108 may store the security policy in, for example, security policies 322. The security policy includes a dynamic address group specifying a segment-specific queryable resource (142B in this example) for the LAN segment at the second site 106B corresponding to the workgroup at the second site specified in the intent-based security policy.

To implement the security policy, first CPE device 108A queries the segment-specific queryable resource (Uniform Resource Locator 142B in this example) associated with the LAN segment at the second site 106B corresponding to the workgroup specified in the intent-based security policy. The frequency at which the first CPE device 108A queries the segment-specific queryable resource may be configurable by the user. In response to the query, first CPE device 108A receives the LAN segment prefix(es) for the LAN segment corresponding to the workgroup at the second site 106B stored in the database 140 of service orchestrator 102. First CPE device 108A stores the LAN segment prefixes for the LAN segment at the second site 106B in forwarding table 318 of CPE device 108A.

Whether the source or destination site needs to be configured to query for the dynamically learned prefixes at the other site depends on the underlying business intent expressed in the intent-based security policy. In some cases, for example, the destination site needs to be configured to query for the dynamically learned LAN segment prefixes of the source site, in some cases the source site needs to be configured to query for the dynamically learned LAN segment prefixes of the destination site, and in some cases both the source and the destination need to be symmetrically configured to query for the dynamically learned LAN segment prefixes of the other site. If the network is segmented, then the prefix awareness will be at the level of the segment.

For example, for some intent-based security policies, such those expressing an intent to allow two-way communication between different workgroups associated with LAN segment prefixes at a first site and a second site, the intent compiler may translate the intent-based security policy into two symmetric security policies, one for the first site and one for the second site. As one example, the first CPE 108A may be configured using a first version of the translated intent-based security policy (or simply, the first security policy) and the second CPE 108B may be configured using a second version of the translated intent-based security policy (or simply, the second security policy). In such examples, the first security policy configures the first CPE 108A to query the segment-specific queryable resource associated with the LAN segment at the second site 106B for the LAN segment prefixes associated with the specified workgroup at the second site, and the second security policy configures the second CPE 108B to query the segment-specific queryable resource associated with the LAN segment at the first site 106A for the specified LAN segment prefixes associated the specified workgroup at the first site. In this way, the first CPE 108A obtains the LAN segment prefixes needed to allow network traffic from LAN segment(s) 104B associated with a workgroup at the second site 106B specified by the intent-based security policy, and/or the second CPE obtains the LAN segment prefixes to allow network traffic from LAN segments 104A associated with a different workgroup at the first site 106A specified by the intent-based security policy.

The techniques of the present disclosure may provide one or more advantages over other systems in which intent-based security policies based on LAN segment prefixes that are dynamically learned at one or more sites in a network are not possible without significant effort. For example, rather than high level, coarse grained security policies that may only be defined on a site-level basis, the techniques of the present disclosure allow finer-grained intent-based security policies to be defined at the more specific LAN segment level. In this way, intent-based security policies specifying workgroups or other LAN segment level groupings may be implemented. This fine-grained functionality allows more specificity in the types of communications that can be controlled and the corresponding types of business intents that can be realized in an SD-WAN or other cloud-based networking environment.

In addition, by configuring CPE devices at each site to automatically query for and receive updated LAN segment prefixes that are dynamically learned at one or more other sites in the network, the techniques of the disclosure provide for distributed and periodic synchronization of all sites in the network without human intervention from the network administrator or the service orchestrator controller. Eliminating human intervention in the distribution of LAN segment prefixes may decrease the possibility of human errors or misconfigurations of devices in the network. Further, the service orchestrator controller does not have to explicitly synchronize the CPE device configurations for dynamically changing LAN segment addresses across the entire customer network; rather, the service orchestrator controller automatically receives and stores the LAN segment prefixes that are dynamically learned at each of the sites in its database, and the CPE devices themselves keep their mutual states synchronized in a distributed fashion by polling the segment-specific resource(s). As a result, at any point the CPE devices in the network will have the latest state in the network without any intervention from the administrator or the service orchestrator controller.

Figure 4:
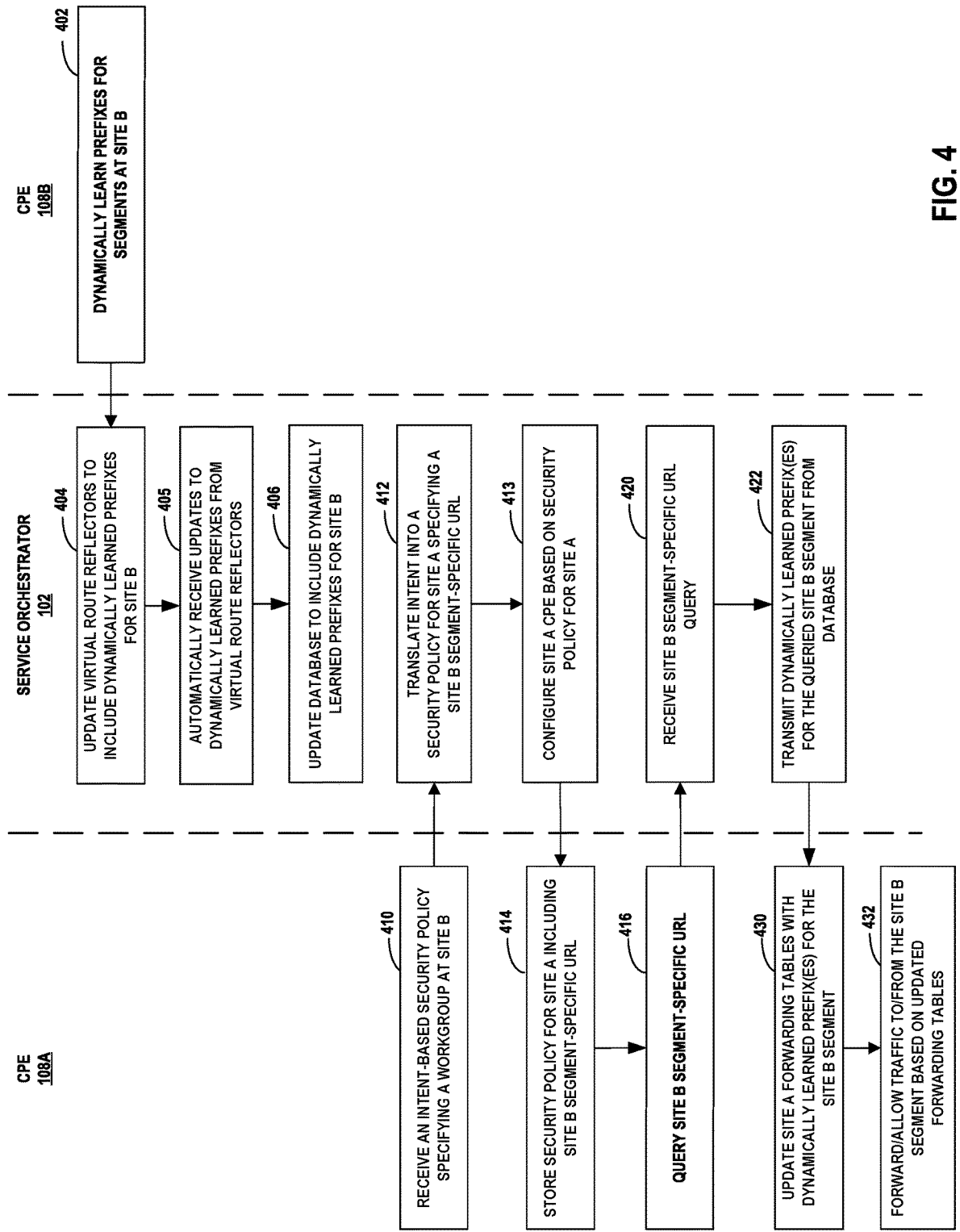
FIG. 4 is a flowchart illustrating an example operation of a service orchestrator controller and two CPE devices to provide for automatic implementation of intent-based security policies in a network system in which network segment prefixes are dynamically learned.

FIG. 4 is a flowchart illustrating an example operation (400) of a service orchestrator controller 120 and CPE devices 108A and 108B to provide for automatic provision of dynamically learned segment-specific network addresses (such as LAN segment prefixes) across multiple CPE devices in a networking environment. The operation 400 is described with respect to network system 100 such as that shown in FIG. 1, but steps of the operation may be performed by any of a service orchestrator, an CPE device, SD-WAN controller, another other computing device, or any combination thereof.

Although the various operations of FIG. 4 are shown as occurring in particular order, in some examples, the operations need not necessarily be performed in the order in which they are shown. In addition, one or more of the operations could be performed entirely independently of each other. One or more of the operations of FIG. 4 may be performed in parallel or in a different or in a reverse order to which they are shown, and the disclosure is not limited in this respect.

In this example, a second CPE device 108B dynamically learns one or more LAN segment prefixes for second site 106B (referred to as Site B in FIG. 4) (402). For example, second CPE device 108B may dynamically learn LAN segment prefixes at the second site 106B using any type of dynamic routing protocol. One or more virtual route reflectors at service orchestrator 102 receive the dynamically learned LAN segment prefixes for Site B and updates the one or more virtual route reflectors to include the dynamically learned prefixes for Site B (404). A routing manager at service orchestrator 102 automatically receives any changes to the dynamically learned prefixes for Site B and updates a database to include the dynamically learned prefixes for Site B (406). In this way, the database reflects the current state of the LAN segment prefixes for Site B.

Independent of operations 402, 404, and/or 406, a first CPE device 108A associated with a first site 106A (referred to as Site A in FIG. 4) receives an intent-based security policy (410). The intent-based security policy may be input by a user. In this example, the intent-based security policy specifies, for example, a rule for communications between Site A (or one or more workgroups at Site A) and one or more workgroups at Site B. In the example of FIG. 4, step (410) is shown in FIG. 4 as being carried out by first CPE device 108A. However, the intent-based security policy may also be input at second CPE 108B, at any other of CPE devices 108A-108N, or through a management interface on the service orchestrator 102.

For example, the intent-based security policy may express an intent to allow network traffic from a specified department at Site B to a specified department at Site A. Although not specified in the intent-based security policy, the workgroup at Site B is associated with a LAN segment a Site B where the LAN segment prefixes are dynamically learned by the CPE device at Site B. This is one advantage of an intent-based security policy, in that a user may express a security policy in terms of a high level business intent without needing to know or specify network implementation details such as LAN segment prefixes at one or both of the sites. In order to implement the intent-based security policy, the CPE at Site A needs to know the LAN segment prefixes at Site B associated with the workgroup at Site B specified in the intent-based security policy. By automatically receiving dynamically learned LAN segment prefixes and storing them in a queryable database, and providing segment-specific queryable resources corresponding to LAN segments at sites in a network system, the techniques of the present disclosure provide a mechanism for sites (e.g., the CPE devices at the sites) to obtain LAN segment prefixes corresponding to LAN segments that are dynamically learned at other sites.

Service orchestrator 102 receives the intent-based security policy and translates the intent-based security policy into a security policy for Site A 106A (412). The security policy specifies a segment-specific queryable resource associated with the LAN segment(s) at the second site 106B (Site B) corresponding to the workgroup at Site B. Service orchestrator 102 configures first CPE device 108A based on the security policy for Site A (413). CPE 106A stores the security policy including the segment-specific queryable resource associated with the workgroup at Site B (414). For example, first CPE device 108A may store the security policy in security policies 322 as shown in FIG. 3.

Service orchestrator 102 manages one or more segment-specific queryable resources, each associated with a different LAN segment the one or more sites 106A-106N. By querying a segment-specific queryable resource, a CPE device, such as CPE device 108A associated with a first site 106A, may obtain LAN segment prefixes for a LAN segment at another one of the sites, such as second site 106B, that were dynamically learned by a CPE device 108B associated with the second site 106B.

To implement the security policy, first CPE device 108A associated with Site A 106A queries the segment-specific queryable resource associated with the LAN segment at the second site 106B corresponding to the workgroup at the second site specified in the intent-based security policy (416). In some examples, the CPE device 108B may issue a query to the segment-specific queryable resource on a periodic basis. The frequency at which first CPE device 108A queries the segment-specific queryable resource associated with the LAN segment at the second site 106B may be configurable by the user, and may be periodic, at one or more specified times, or on demand.

Service orchestrator 102 receives the query (420), and, in response to the query, returns the dynamically learned LAN segment prefixes for the LAN segment at Site B corresponding to the workgroup at Site B from the database (422). In some examples, the segment-specific queryable resource may include a segment-specific Uniform Resource Locator. In such examples, service orchestrator 102 implements a feed server that manages queries to the segment-specific queryable resources. In response to a query, the feed server transmits one or more LAN segment prefixes stored in the SO database associated with the queried segment-specific queryable resource from the database (such as database 140 as shown in FIGS. 2A and 2B) to the CPE device that issued the query (CPE device 108A in this example).

CPE device 108A receives and updates one or more forwarding tables at CPE device 108A with the dynamically learned LAN segment prefixes for the LAN segment at Site B received in response to the segment-specific query (430). CPE device 108A associated with first site 106A then forwards or allows (depending upon the rules set by the policy) network traffic to/from the second site 106B based on the updated forwarding tables for any network traffic matching the conditions of the security policy (432).

In addition, in some examples and depending upon the policy, service orchestrator 102 may further configure second CPE device 108B according to a symmetric security policy to carry out complementary functions necessary to realize the intent expressed in the intent-based security policy.

With reference again to FIG. 4, a specific example of automatic implementation of intent-based security policies in a network system in which network segment prefixes for network segments at one or more sites in the network system (for example, LAN segment prefixes for LAN segments) are dynamically learned in accordance with one or more techniques of this disclosure will be described. The following example is given for purposes of illustration only, and the disclosure is not limited in this respect.

In this example, assume an intent-based security policy is expressed as follows:

Intent Definition:
Allow traffic from department Sales in Site Sunnyvale to department HR in Site Bangalore.
Discard traffic from any other site to Site Bangalore.

The intent-based security policy is received by one of CPE devices 108A-108N at one of sites 106A-106N or at the management interface of SO controller 120. The intent-based security policy is compiled by intent compiler 124 running on SO controller 120, and the intent may be realized by configuring a CPE device at Site Sunnyvale and a CPE device at Site Bangalore as follows:

At Site Sunnyvale:
Allow traffic from local security Zone Sales to local security Zone Overlay.

At Site Bangalore:
Allow traffic from local security Zone Overlay and "All source addresses of Department Sales in Site Sunnyvale" to local security Zone HR.

In this example, SO controller 120 needs to know the "All addresses of Department Sales in Site Sunnyvale" and configure the CPE device accordingly at site Bangalore. For purposes of this example, Site Bangalore may be considered "Site A" in the flowchart of FIG. 4 and Site Sunnyvale may be considered "Site B."

CPE device 108B at site Sunnyvale 106B dynamically learns one or more LAN segment prefixes for the LAN segments 104B at Site Sunnyvale 106B (402). In this particular example, CPE device 108B at Site Sunnyvale dynamically learns the LAN segment prefix(es) associated with "All addresses of Department Sales at Site Sunnyvale." Service orchestrator 102 receives the dynamically learned LAN segment prefixes for Site Sunnyvale and updates one or more virtual route reflectors to include the dynamically learned prefixes for Site Sunnyvale (404). Service orchestrator 102 automatically receives the dynamically learned LAN segment prefixes for site Sunnyvale and stores the LAN segment prefixes for Site Sunnyvale in a database (406). This may also include automatically receiving updates or changes to the dynamically learned LAN segment prefixes for Site Sunnyvale (406).

Independent of operations 402, 404, and/or 406, CPE device 108A at Site Bangalore receives an intent-based security policy (410). Although step (410) is shown in FIG. 4 as being carried out at CPE device 108A associated with Site Bangalore (Site A in this example), a user may also input an intent-based security policy at CPE 108B associated with Site Sunnyvale, through a management interface on the service orchestrator 102, or at any of CPEs 108A-108N in the network. As described above, the intent-based security policy specifies a rule for communication from the workgroup "All addresses of Department Sales at site Sunnyvale" to Site Bangalore.

Service orchestrator 102 receives the intent-based security policy and translates the intent-based security policy into a security policy for CPE 108A associated with Site Bangalore (412). The security policy includes a segment-specific queryable resource associated with the workgroup "All Addresses of Department Sales at Site Sunnyvale."

Service orchestrator 102 configures CPE device 108A associated with Site Bangalore based on the security policy (413). CPE device 108A associated with Site Bangalore stores the security policy including the segment-specific queryable resource associated with "All Addresses of Department Sales at Site Sunnyvale" received from service orchestrator 102 (414).

To implement the security policy, CPE device 108A associated with Site Bangalore queries the segment-specific queryable resource (e.g., Uniform Resource Locator 142B) associated with "All Addresses of Department Sales at Site Sunnyvale" (416). As mentioned herein, the query may take place periodically and the frequency at which first CPE device 108A periodically queries the segment-specific queryable resource may be configurable by the user. Service orchestrator 102 (e.g., feed server 130 implemented by service orchestrator 102) receives the query (420), and, in response to the query, returns the dynamically learned LAN segment prefixes corresponding to "All Addresses of Department Sales at Site Sunnyvale" from the database (422).

CPE device 108A associated with Site Bangalore receives and updates one or more forwarding tables with the LAN segment prefixes that were dynamically learned at Site Sunnyvale received in response to the segment-specific query (430). CPE device 108A associated with Site Bangalore is now configured to allow communications from "All Addresses of Department Sales at Site Sunnyvale" to Department HR at Site Bangalore. CPE device 108A associated with Site Bangalore then allows network traffic from "All Addresses of Department Sales at Site Sunnyvale" based on the updated forwarding tables for any network traffic received from the LAN segment prefixes in the "All Addresses of Department Sales at Site Sunnyvale" (432).

In this example, where the intent-based security policy specifies a rule for one-way communication from "All Addresses of Department Sales at Site Sunnyvale" to "Department HR at Site Bangalore", there is no need to configure Site Sunnyvale to query for any LAN segment prefixes at Site Bangalore. In other examples, however, both the first site and the second site specified in an intent-based security policy may be configured in a symmetrical way in order to carry out the expressed intent. For example, if the intent-based security policy was to allow two-way communication between "All Addresses of Department Sales at Site Sunnyvale" and "All Addresses of Department HR at Site Bangalore", CPE device 108B at Site Sunnyvale may be configured with a symmetric security policy to periodically query a segment-specific queryable resource for the workgroup "All Addresses of Department HR at Site Bangalore" to obtain dynamically learned prefixes corresponding to the LAN segment(s) of "Department HR at Site Bangalore." CPE device 108B associated with Site Sunnyvale would then allow network traffic from the LAN segment prefixes corresponding to "Department HR at Site Bangalore."

Figure 5:
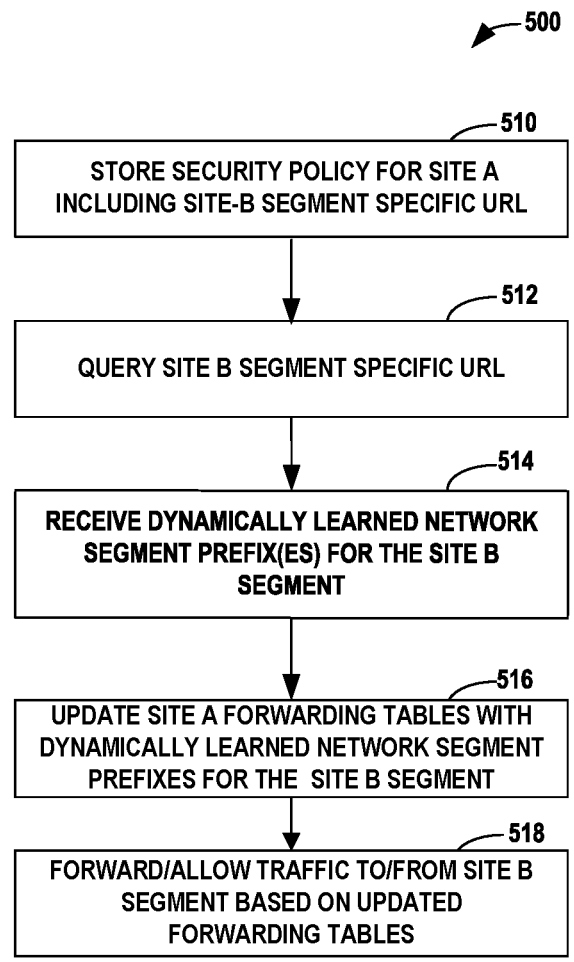
FIG. 5 is a flowchart illustrating example operation of a CPE device, in accordance with one or more techniques of this disclosure.

FIG. 5 is a flowchart illustrating example operation of a device, such as a CPE device, in accordance with one or more techniques of this disclosure. In this example, an intent-based security policy expresses a business level intent associated with a first site (Site A in this example) and a workgroup at a second site (Site B in this example) in a network system. A device (e.g., a CPE device) associated with the first site stores a security policy that specifies a segment-specific queryable resource associated with the workgroup at the second site that was specified in the intent-based security policy (510). The security policy stored by the device was translated from the intent-based security policy by the network service orchestrator controller. In implementing the security policy, the device queries the segment-specific queryable resource associated with the workgroup at the second site (512). The device receives, in response to the query, one or more network segment prefixes associated with one or more network segments for the workgroup at the second site (514). The device further updates a forwarding table of the device with the network segment prefixes received in response to the query (516). The device forwards or allows (depending upon the policy), based on the updated forwarding table, network traffic to/from the second site (518).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. Non-transitory computer-readable storage media comprising encoded instructions for causing one or more processors to, at least one of collectively or individually:
   translate an intent-based policy to a policy for a first site of a network system, the policy for the first site specifying a segment-specific queryable resource associated with a second site of the network system;
   store network segment prefixes associated with one or more network segments at the second site, the network segment prefixes learned at the second site via a routing protocol; and
   configure, based on the policy for the first site, a first device associated with the first site to query the segment-specific queryable resource associated with the second site to obtain, in response to the query, the network segment prefixes.

2. The non-transitory computer-readable storage media of claim 1, further comprising instructions for causing the one or more processors to:
   manage a plurality of segment-specific queryable resources, each associated with a different one of a plurality of sites in the network system; and
   transmit, in response to a query to one of the plurality of segment-specific queryable resources, network segment prefixes associated with one or more network segments at a site corresponding to a queried segment-specific queryable resource, to one of a plurality of devices that issued the query.

3. The non-transitory computer-readable storage media of claim 2, wherein the plurality of segment-specific queryable resources includes a plurality of segment-specific Uniform Resource Locators, the non-transitory computer-readable storage media further comprising instructions for causing the one or more processors to:
   implement a feed server that manages queries to the plurality of segment-specific Uniform Resource Locators and, in response to a query, returns one or more network segment prefixes corresponding to a queried segment-specific Uniform Resource Locator stored in a database.

4. The non-transitory computer-readable storage media of claim 1, wherein the network system comprises a plurality of sites comprising the first site and the second site, the non-transitory computer-readable storage media further comprising instructions for causing the one or more processors to:
   receive notifications from one or more virtual route reflectors indicative of changes to network segment prefixes at one or more sites of the plurality of sites in the network system; and
   store data indicative of the changes to the network segment prefixes at the one or more sites.

5. The non-transitory computer-readable storage media of claim 1, wherein the intent-based policy specifies a workgroup corresponding to at least one of the one or more network segments at the second site.

6. The non-transitory computer-readable storage media of claim 1, wherein:
   the network system comprises a software-defined wide area network (SD-WAN),
   the first device comprises a customer premises equipment (CPE) device,
   the one or more network segments comprise Local Area Network (LAN) segments at the second site, and
   the network segment prefixes comprise LAN segment prefixes corresponding to the LAN segments at the second site.

7. Non-transitory computer-readable storage media comprising encoded instructions for causing one or more processors of a computing system associated with a first site in a network system to, at least one of collectively or individually:
   store a policy that specifies a segment-specific queryable resource associated with a second site in the network system, wherein the policy is translated from an intent-based policy specifying the segment-specific queryable resource associated with the second site;

query, in implementing the policy, the segment-specific queryable resource associated with the second site;

receive, in response to the query, network segment prefixes associated with one or more network segments at the second site;

update a forwarding table with the network segment prefixes received in response to the query; and control, based on the updated forwarding table, network traffic between the first site and the second site.

8. The non-transitory computer-readable storage media of claim 7, wherein the policy comprises a security policy, and wherein the segment-specific queryable resource associated with the second site is queryable via a segment-specific Uniform Resource Locator specified by the security policy.

9. The non-transitory computer-readable storage media of claim 7, wherein the computing system is a first computing system, and wherein the intent-based policy is received by the first computing system based on input by a user at one of the first computing system associated with the first site, a second computing system associated with the second site, or a management interface associated with a network service orchestrator.

10. The non-transitory computer-readable storage media of claim 7, wherein the intent-based policy specifies a user group corresponding to at least one of the one or more network segments at the second site.

11. The non-transitory computer-readable storage media of claim 7 wherein querying the segment-specific queryable resource associated with the second site further comprises periodically querying the segment-specific queryable resource for the second site at a user-configurable frequency.

12. The non-transitory computer-readable storage media of claim 7, wherein the network segment prefixes associated with the one or more network segments at the second site are associated with a workgroup at the second site.

13. A device associated with a first site in a network system, the device comprising processing circuitry, wherein the device is configured to:

store a policy that specifies a segment-specific queryable resource associated with a second site in the network system, wherein the policy is translated from an intent-based policy specifying the segment-specific queryable resource associated with the second site;

query, in implementing the policy, the segment-specific queryable resource associated with the second site;

receive, in response to the query, network segment prefixes associated with one or more network segments at the second site;

update a forwarding table with the network segment prefixes received in response to the query; and control, based on the updated forwarding table, network traffic between the first site and the second site.

14. The device of claim 13, wherein the segment-specific queryable resource associated with the second site is queryable via a segment-specific Uniform Resource Locator specified by the policy, and wherein querying the segment-specific queryable resource associated with the second site further comprises periodically querying the segment-specific queryable resource for the second site at a user-configurable frequency.

15. The device of claim 13, wherein the device is a first device, wherein the intent-based policy is received by the first device based on input by a user at one of the first device associated with the first site, a second device associated with the second site, or a management interface associated with a network service orchestrator, wherein the intent-based policy specifies a user group corresponding to at least one of the one or more network segments at the second site.

16. A device comprising processing circuitry and memory, the processing circuitry configured to:

translate an intent-based policy to a policy for a first site of a network system, the policy for the first site specifying a segment-specific queryable resource associated with a second site of the network system;

store network segment prefixes associated with one or more network segments at the second site, the network segment prefixes learned at the second site via a routing protocol; and configure, based on the policy for the first site, a first device associated with the first site to query the segment-specific queryable resource associated with the second site to obtain, in response to the query, the network segment prefixes.

17. The device of claim 16, wherein the processing circuitry is further configured to:

manage a plurality of segment-specific queryable resources, each associated with a different one of a plurality of sites in the network system; and transmit, in response to a query to one of the plurality of segment-specific queryable resources, network segment prefixes associated with one or more network segments at a site corresponding to the queried segment-specific queryable resource, to one of a plurality of devices that issued the query.

18. The device of claim 17, wherein the processing circuitry is further configured to:

receive notifications from one or more virtual route reflectors indicative of changes to network segment prefixes at one or more sites in the network system; and store data indicative of the changes to the network segment prefixes at the one or more sites.

19. The device of claim 16, wherein:

the network system comprises a software-defined wide area network (SD-WAN), the first device comprises a customer premises equipment (CPE) device, the one or more network segments comprise Local Area Network (LAN) segments at the second site, and the network segment prefixes comprise LAN segment prefixes corresponding to the LAN segments at the second site.

20. The device of claim 16, wherein the policy comprises a security policy, wherein the processing circuitry is configured to translate the intent-based policy to the security policy.

* * * * *